United States Patent [19]
Obser

[11] 3,796,500
[45] Mar. 12, 1974

[54] METHOD AND ARRANGEMENT FOR ADJUSTING OPTICAL DEVICES

[75] Inventor: Werner G. Obser, Geretsried, Germany

[73] Assignee: Erwin Sick, Waldkirch, An der Alle, Germany

[22] Filed: Sept. 15, 1972

[21] Appl. No.: 289,351

[30] Foreign Application Priority Data
Sept. 15, 1971 Germany................. P 21 46 139.2

[52] U.S. Cl.................. 356/237, 66/165, 356/256
[51] Int. Cl....................... G01n 21/16, G02b 27/32
[58] Field of Search .................. 356/4, 5, 237, 256; 66/165

[56] References Cited
UNITED STATES PATENTS
3,529,445  9/1970  Brose................................. 66/165
3,385,159  5/1968  Bliss et al............................ 356/4

*Primary Examiner*—Ronald L. Wibert
*Assistant Examiner*—V. P. McGraw

[57] ABSTRACT

Method of adjusting optical devices which with the aid of a light beam sense an object periodically reflecting light varyingly and which monitor the reflected light in respect of variations of a predetermined sequence of intensity fluctuations, which comprises converting the intensity fluctuations into an acoustically audible signal and then varying the alignment of the optical device in relation to said object until the acoustically audible signal attains a maximum value.

10 Claims, 1 Drawing Figure

PATENTED MAR 12 1974 3,796,500
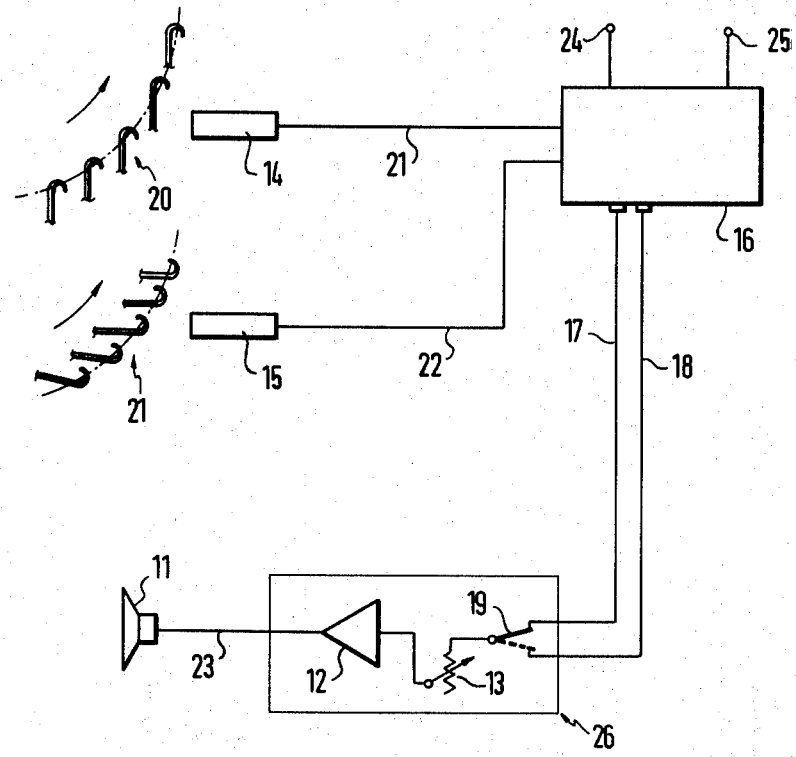

METHOD AND ARRANGEMENT FOR ADJUSTING OPTICAL DEVICES

The invention relates to a method and apparatus for adjusting optical devices which with the aid of a light beam sense an object periodically reflecting light varyingly, and which monitor the reflected light in respect of variations of a predetermined sequence of intensity fluctuations.

Particularly in the case of needle sensors in circular knitting machines working with optical sensing heads, the problem arises of achieving optimum adjustment of the needle sensor to the rows of needles to be sensed. The more accurate the adjustment of the optical head in relation to the needles, the clearer will be the signal received by the evaluating electronic system and the more reliably will the machine be switched off if a needle should break.

An object of this invention consists in providing a simple method of the kind first mentioned above, which can be carried out without difficulty even by inexperienced operators and with the aid of which it is possible to effect optimum adjustment of the optical device, particularly of the optical sensing heads of needle sensors in circular knitting machines.

For the purpose of solving this problem, the invention provides for the fluctuations of intensity to be converted into an acoustically audible signal and for the alignment of the optical device in relation to the object to be modified until the acoustically audible signal attains a maximum value. In this method therefore the operator adjusts only the optical device, particularly the optical sensing head of a circular knitting machine, in respect of its different degrees of freedom until the signal, which for example can be heard in headphones, reaches a maximum. The operation of the system is therefore entirely foolproof and ensures optimum adjustment even when carried out by inexperienced operators, so that the needle sensors can work with maximum efficiency.

A preferred embodiment for carrying out the method according to the invention with an optical device which senses the object, and which supplies a varying electrical signal corresponding to the reflected light, is characterized according to the invention in that the varying signal is fed to an electroacoustic transducer. The electroacoustic transducer is preferably a headphone worn by the operator. In this way the adjustment is not disturbed by ambient noises.

The electroacoustic transducer is preferably preceded in the circuit by an amplifier and a volume control, so that the operator can set the audible tone to an agreeable level before the actual adjustment work is started.

The arrangement according to the invention is preferably used in a circular knitting machine in which the optical heads are directed towards the needles and in which an evaluating electronic system transmits a machine stop signal in the event of a needle breaking.

The invention preferably provides for the varying signal serving to feed the electroacoustic transducer to be branched off from the evaluating electronic system. The latter is thus additionally used for producing the audible signals.

The application to circular knitting machines is particularly convenient because the varying signals produced by the optical sensing lie within the audible range, that is to say, can be evaluated without previous frequency multiplication or division.

It may be preferable to provide separate optical heads for the cylinder needles and for the dial needles, while two lines branch off from the evaluating electronic system, one of them receiving the varying signal coming from one optical head and the other receiving that coming from the other optical head. In addition, it is convenient to dispose between the electroacoustic transducer and the lines a change-over switch with the aid of which the signal coming from one or the other optical head can be selectively fed to the electroacoustic transducer. In this way the operator can directly adjust both optical heads with the aid of a single headphone, by suitable switching over.

In another preferred embodiment, the change-over switch is combined with the amplifier and volume control to form a single unit.

It is advantageous for this unit to be situated in the direct proximity of the person adjusting the optical heads, so that he can adjust the volume immediately before making the actual adjustment.

The two optical heads, the evaluating electronic system, the previously mentioned unit, and the headphone are preferably separate elements which are connected by flexible cables. In this way the optical heads can be disposed individually in the most favorable positions. The evaluating electronic system can be accommodated in a position where it causes no disturbance, while the unit containing the volume control can likewise be installed in a position where it is readily accessible to the operator.

The invention is described below, by way of example, with the aid of the drawing, in which the single FIGURE shows schematically a block circuit diagram which can be used for carrying out the method according to the invention.

According to the drawing, optical heads 14, 15 are disposed near the cylinder needles 20 and dial needles 21 of a circular knitting machine and are connected by flexible cables 21, 22 to an evaluating electronic system 16. The evaluating electronic system 16 is connected to the mains at 25, while the machine stop signal appears at 24. According to the invention two other lines 17, 18 branch off from a evaluating electronic system 16 and carry a varying electrical signal which corresponds to the varying light received by the optical heads 14 and 15 respectively. The lines 17, 18 are connected by way of a change-over switch 19, a volume control 13, an amplifier 12, and a line 23 to a headphone 11. According to the invention the change-over switch 19, the amplifier 12, and the volume control 13 are grouped together to form a unit which is in the form of a rectangular box.

With the arrangement illustrated the method according to the invention is carried out in the following manner:

The change-over switch 19 is first brought to the position shown in solid lines in which the optical head 14 is connected by way of the evaluating electronic system 16 and the line 17 to the headphone 11. The operator first adjusts the optical head 14 substantially in relation to the row of needles 20 and then with the aid of the volume control 13 adjusts the most favorable volume. The optical head 14 is then adjusted in its various degrees of freedom until the signal audible in the headphone 11 reaches a maximum. The volume can, if desired, be readjusted from time to time.

As soon as this has been done, the evaluating electronic system 16 receives a varying signal optimally suitable for monitoring the machine.

The change-over switch 19 is then moved to the position shown in broken lines, and the same operation is repeated for the optical head 15 in relation to the row of needles 21.

Frequencies in the audible range from 50c/s to 15 kc/s are particularly preferred for the method and arrangement according to the invention. The frequencies which occur in the needle signals of circular knitting machines lie between 100c/s and 1kc/s, and are therefore particularly suitable for the evaluation.

Obviously, the embodiment shown is exemplary only and a wide variety of embodiments may be devised without departing from the spirit and scope thereof.

What is claimed is:

1. A method of adjusting an optical needle sensor in circular knitting machines which with the aid of a light beam sense an object periodically reflecting light varyingly and which monitor the reflected light in respect of variations of a predetermined sequence of intensity fluctuations, which comprises converting the intensity fluctuations into an acoustically audible signal and then varying the alignment of the optical device in relation to said object until the acoustically audible signal attains a maximum value.

2. The method of claim 1 including supplying a varying electrical signal corresponding to the reflected light and feeding the varying signal to an electroacoustic transducer.

3. A device for determining the optimum positioning of a plurality of optical needle sensors disposed in spaced relationship to the cylinder and dial needles in a circular knitting machine, the sensors producing a series of electrical signals corresponding to the intensity of light reflected from the needles as these needles pass the sensors, the electrical signals being transmitted to an evaluating electronic system controlling the operation of the circular knitting machine, comprising means connected to said sensors to simultaneously receive the electrical signals sent to said evaluating electronic system and converting these signals into correspondingly acoustically audible signals whereby the positioning of said sensors with regard to the path of movement of said needles can be varied to achieve the optimum position corresponding to the maximum acoustically audible signal produced by said means.

4. The device of claim 3 wherein a varying electrical signal corresponding to light reflected from said needles is fed to an electroacoustic transducer.

5. The device of claim 4 wherein said electroacoustic transducer is a headphone worn by an operator.

6. The device of claim 4 including amplifier means and a volume control means receiving said signals and feeding them to said electroacoustic transducer.

7. The device of claim 3 wherein there are separate optical sensors for the cylinder needles and for the dial needles and wherein the electrical signals are fed to said means by two lines branching off from said evaluating electronic system, one of said lines receiving the signals coming from one optical sensor and the other of said lines receiving the signals coming from the other optical sensor.

8. The device of claim 7 including switch means connected between said electroacoustic transducer and said two lines whereby the signal coming from one or the other optical sensor can be connected selectively to said electroacoustic transducer.

9. The device of claim 8 wherein said switch means is a change-over switch and said switch is combined with said amplifier means and said volume control means so as to form a single unit.

10. The device of claim 9 wherein said two optical sensors, said evaluating electronic system, said unit, and said electroacoustic transducer are separate elements which are connected by flexible cables.

* * * * *